US006434143B1

(12) United States Patent
Donovan

(10) Patent No.: US 6,434,143 B1
(45) Date of Patent: *Aug. 13, 2002

(54) INTERNET PROTOCOL TELEPHONY VOICE/VIDEO MESSAGE DEPOSIT AND RETRIEVAL

(75) Inventor: Steven R. Donovan, Plano, TX (US)

(73) Assignee: MCI WorldCom, Inc., Jackson, MS (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,795

(22) Filed: Nov. 8, 1999

(51) Int. Cl.[7] .......................... H04L 12/28; H04L 12/66

(52) U.S. Cl. ...................... 370/356; 370/351; 370/352; 370/912; 379/67.1; 379/70; 379/88.17; 379/88.23; 379/88.25; 379/88.26; 379/900

(58) Field of Search ................................ 370/351, 352, 370/356, 912; 379/67.1, 70, 88.17, 88.23, 88.25, 88.26, 900

(56) References Cited

U.S. PATENT DOCUMENTS

| | | | |
|---|---|---|---|
| 5,699,359 A | | 12/1997 | Suga |
| 5,732,219 A | * | 3/1998 | Blumer et al. ......... 395/200.57 |
| 5,742,763 A | * | 4/1998 | Jones ..................... 395/200.3 |
| 5,794,039 A | * | 8/1998 | Guck ......................... 395/683 |
| 5,802,510 A | * | 9/1998 | Jones ............................ 707/2 |
| 5,826,039 A | * | 10/1998 | Jones .................... 395/200.36 |
| 5,832,221 A | * | 11/1998 | Jones .................... 375/200.36 |
| 5,859,898 A | * | 1/1999 | Checco .................... 379/88.01 |
| 5,864,610 A | | 1/1999 | Ronen |
| 5,867,494 A | * | 2/1999 | Kirshnaswamy et al. ... 370/352 |
| 5,867,495 A | * | 2/1999 | Elliott et al. ................ 370/352 |
| 5,889,774 A | | 3/1999 | Mirashrafi et al. |
| 5,907,547 A | | 5/1999 | Foladate et al. |
| 5,923,659 A | | 7/1999 | Curry et al. |
| 5,953,504 A | | 9/1999 | Sokal et al. |
| 5,956,391 A | | 9/1999 | Melen et al. |

(List continued on next page.)

FOREIGN PATENT DOCUMENTS

EP 0123456 1/2000

OTHER PUBLICATIONS

Henning Schulzrinne. A comprehensive multimedia control architecture for the Internet. 1997 IEEE, pp. 65–76.*
M. Handley, H. Schulzrinne, E. Schooler, and J. Rosenberg. SIP: Session Initiation Protocol. Network Working Group, Request fo Comments 2543. Mar. 1999. pp. 1–104.*
Gonzalo Camarillo, Jan Holler, and Goran AP Eriksson. The SD fid attribute, Internet Engineering Task Force, Internet Draft, Apr. 2001. pp. 1–4.*

(List continued on next page.)

Primary Examiner—Hassan Kizou
Assistant Examiner—Joe Logsdon

(57) ABSTRACT

A method for signaling an Integrated Messaging System (IMS) on an Internet Protocol (IP) based network to deposit a message, including the steps of sending a Session Initiation Protocol (SIP) SIP INVITE request to the IMS indicating a message deposit action; receiving a corresponding SIP message from the IMS agreeing to participate in the message deposit action; and sending an SIP acknowledge message to the IMS confirming receipt of the corresponding SIP message; and depositing the message in a destination mailbox. A method of signaling an IMS on an IP based network to retrieve a deposited message, the method including the steps of sending a SIP INVITE request to the IMS indicating a message retrieval action; receiving a corresponding SIP message from the IMS agreeing to participate in the message retrieval action; sending an SIP acknowledge message to the IMS confirming receipt of the corresponding SIP message; and retrieving the deposited message from a mailbox corresponding to known account information.

20 Claims, 3 Drawing Sheets-

U.S. PATENT DOCUMENTS

| | | | |
|---|---|---|---|
| 5,958,005 A | * 9/1999 | Thorne et al. | 709/202 |
| 5,999,525 A | * 12/1999 | Kirshnaswamy et al. | 370/352 |
| 6,094,525 A | 7/2000 | Perlman et al. | |
| 6,137,869 A | 10/2000 | Voit et al. | |
| 6,201,858 B1 | * 3/2001 | Sundhar | 379/88.12 |
| 6,202,081 B1 | 3/2001 | Naudus | |
| 6,215,858 B1 | * 4/2001 | Bartholomew et al. | 379/88.17 |

OTHER PUBLICATIONS

Jonathan Rosenberg. SIP: Past, Present and Future. www.dynamicsoft.com. May 10, 2000.*

Cable Television Laboratories, Inc. PacketCable CMS to CMS Signaling Specification, Nov. 28, 2000.*

W. Marshall, K. Ramakrishnan, E. Miller, B. Beser, M. Mannette, D. Oran, J. Pickens, P. Lalwaney, J. Fellows, D. Evans, and K. Kelly. SIP proxy–to–proxy extensions for supporting DCS. SIP Working Group Internet Draft. Nov. 2000. pp. 1.24.*

Darrin Woods. Translating Menus at the VOIP Café. www.networkcomputing.com/1026/1026ws1.html. Dec. 27, 1999. pp. 1–4.*

Cisco Systems, Inc. Architecture for Voice, Video and Integrated Data. 2000. pp. 1–23.*

Henning Schulzrinne, The Session Initiation Protocol (SIP). www.cs.columbia.edu/~hgs. Sep. 28, 2000.*

Henning Schulzrinne. Internet Telephony and Multimedia: Status and Directions. Aug. 7, 2000.*

Elin Wedlund and Henning Schulzrinne. Mobility Support Using SIP. ACM 1999. pp. 76–82.*

Henning Schulzrinne and Jonathan Rosenberg. The Session Initiation Protocol: Internet–Centric Signaling. IEEE Communications Magazine. Oct. 2000. pp. 134–141.*

Ismail Dalgic, Michael Borella, Rick Dean, Jacek Grabiec, Jerry Mahler, Guido Schuster, and Ikhlaq Sidhu. True Number Portability and Advanced Call Screening in a SIP–Based IP Telephony System. IEEE Communications Magazine. Jul. 1999. pp. 96–101.*

* cited by examiner

INTERNET PROTOCOL TELEPHONY VOICE/VIDEO MESSAGE DEPOSIT AND RETRIEVAL

BACKGROUND OF THE INVENTION

1. Field of Invention

The present invention relates to Internet Protocol telephony, and more particularly to a method for handling the signaling related to the storing and forwarding of voice and video messages in an Internet Protocol based network.

2. Description of the Related Art

Internet Protocol (IP) telephony is the real time delivery of voice, and other multimedia data, between two or more parties across a network using Internet protocols. Internet telephony began in the mid-1990's with PC-to-PC Internet telephony, which required both parties to have a personal computer with specialized hardware and software, allowing voice signals to be transmitted over the Internet. More recently, IP telephony systems have been suggested which utilize the existing public switched telephone network (PSTN) infrastructure integrated with IP networks, such as the Internet.

Internet technology is session based, rather than connection based. An Internet protocol, such as Session Initiation Protocols (SIP) is typically used to establish the session and negotiate the capabilities for the session. Once the session is established, the actual media is transported across the IP network using a different protocol, such as Real-time Transport Protocol (RTP). IP telephony use has advanced rapidly since its introduction.

IP telephony has advantages over the PSTN, providing a cost savings for both users and carriers while allowing the transport of a variety of media types, such as voice and video, as opposed to just voice as in the case of the PSTN. While IP telephony may someday replace the PSTN, it suffers some disadvantages in that it currently lacks many of the features already developed for the PSTN. One such feature is call message deposit and retrieval.

The SIP protocol is currently a leading protocol for establishing IP telephony sessions. However, currently no definitions have been established in the SIP protocol to handle the call forwarding logic and signaling requirements necessary for proper interfacing with messaging systems for message deposit and retrieval. The conditional forwarding of calls for deposit in a messaging system is generally done when a called party is either busy or fails to answer a call. A called party may also wish to have a caller unconditionally deposit a message in a messaging system. In either case, the messaging system interface must provide signaling capabilities to store the message, whether conditionally or unconditionally, and also for a called party to later retrieve the deposited message. The signaling capabilities must also include information about the calling party depositing the message. The identity of the called party must also be verified when he or she retrieves the deposited message.

Therefore, a need exists for a method of handling the signaling required for IP telephony voice and video message deposit and retrieval in an IP based network using the SIP protocol, thereby allowing integration of the IP network with an Integrated Messaging System (IMS).

SUMMARY OF THE INVENTION

It is therefore an object of the present invention to provide a method of handling the SIP signaling requirements associated with routing calls to an IMS to allow a calling party to conditionally deposit a message in a called party's message mailbox, in an Internet Protocol based network.

It is another object of the present invention to provide a method of handling the SIP signaling requirements associated with routing calls to an IMS to allow a calling party to unconditionally deposit a message in a called party's message mailbox, in an Internet Protocol based network.

It is yet another object of the present invention to provide a method of handling the SIP signaling requirements associated with routing calls to the IMS to allow a calling party to retrieve the deposited message in the called party's messaging mailbox, in an Internet Protocol based network.

It is still another object of the present invention to provide a method of handling the SIP signaling requirements associated with notifying the called party that a new message has been deposited in the called party's message mailbox, in an Internet Protocol based network.

To achieve the above objects, a method in accordance with the present invention is provided for signaling an IMS on an IP based network to deposit a message, the method including the steps of sending a SIP INVITE request to the IMS indicating a message deposit action; receiving a corresponding SIP message from the IMS agreeing to participate in the message deposit action; and sending an SIP acknowledge message to the IMS confirming receipt of the corresponding SIP message; and depositing the message in a destination mailbox.

Also provided is a method of signaling an IMS on an IP based network to retrieve a deposited message, the method including the steps of sending a SIP INVITE request to the IMS indicating a message retrieval action; receiving a corresponding SIP message from the IMS agreeing to participate in the message retrieval action; sending an SIP acknowledge message to the IMS confirming receipt of the corresponding SIP message; and retrieving the deposited message from a mailbox corresponding to known account information.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFERRED EMBODIMENT

Figure 1:
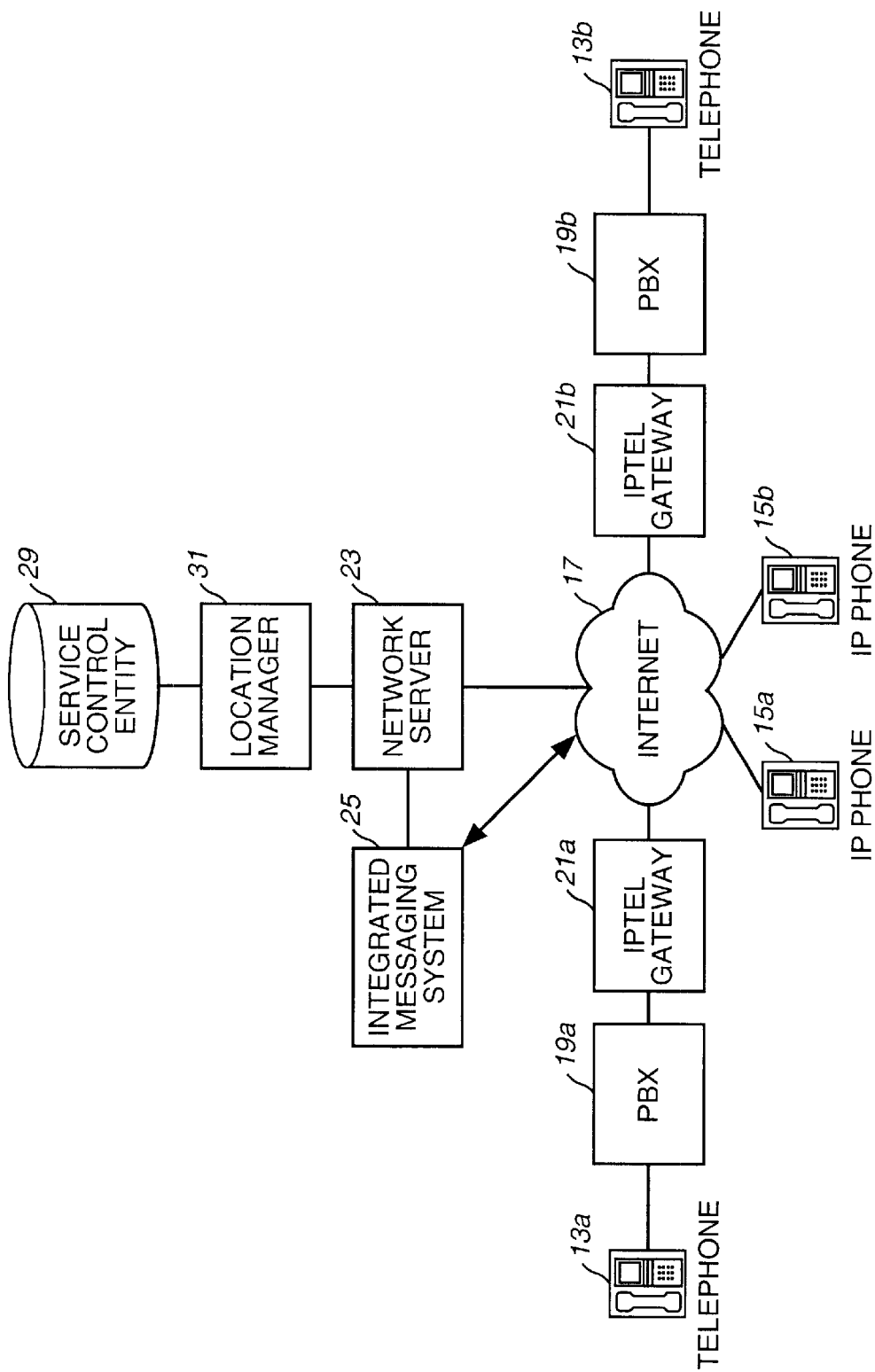
FIG. 1 is a block diagram illustrating a system supporting the method of the present invention.

Turning now to the drawings, in which like reference numerals identify similar or identical elements throughout the several views, FIG. 1 is a block diagram illustrating a system providing telephony services between and among subscribers using traditional telephones 13 and Internet telephones 15. Signaling and media for calls are transported over the Internet 17.

Traditional telephones 13 are connected to the Internet 17 through traditional telephone switching equipment, such as PBX's and IP telephony gateways 21. IP telephony gateways 21 each include a signaling gateway (not shown) and a media gateway (not shown). The signaling gateway provides bi-directional transportation between PSTN telephony signaling and IP telephony signaling messages, such as SIP. IP phones 15 may be connected directly to the Internet through a local area network or by a modem connection through an Internet service provider.

Generally, call signaling and media are transported across the Internet 17 between an originating IP telephony gateway 21a and a destination IP telephony gateway 21b. Typically, routing information is supported by a proxy server, such as a network server (NS) 23. The NS 23 also provides call control and call forwarding control. That is, the NS 23 includes an intermediary application program that acts as both a server and a client for the purposes of making requests on behalf of other clients or, referred to generally as calling parties hereinafter. In the SIP protocol an INVITE request is sent from the originating IP telephony gateway 21a to the address of the called party at the NS 23. IP call setup signaling messages are transported back and forth between the IP telephony gateways 21 and the NS 23 until the call is setup using the SIP protocol, as is commonly known in the art.

The system also includes a location manager 31, which provides gateway selection and mobility management services to the NS 23. The location manager 31 functions as an SIP redirect server. A redirect server is a server that accepts an SIP request, maps the address into zero or more new addresses and returns these addresses to the sender, for instance the NS 23. Unlike an SIP proxy server such as the NS 23, a redirect server does not initiate its own SIP requests or accept calls. Thus, if the NS 23 cannot send a session initiation request to the IP telephony gateway 21, the NS 23 sends a session initiation request to the called party at the location manager 31. The location manager 31 either consults its own database or accesses the legacy service control entity 29 to obtain a new address for the called party. The location manager 31 then returns the new address to the NS 23.

In cases where the called party can not be reached, i.e. the phone is busy or not answered, the call is forwarded to an Integrated Messaging System (IMS) 25. In order to properly forward, deposit and retrieve the messages in the IMS 25, the NS 23 must communicate with the IMS 25 using the SIP protocol. Currently there are no definitions established for using the SIP protocol to handle conditional call forwarding logic and the signaling requirements necessary for proper interfacing with messaging systems. The present invention establishes the SIP signaling requirements for interfacing with an IMS 25.

The NS 23 sends one or more SIP requests to the IMS 25 and receives one or more responses from the IMS 25. A request (and its retransmissions) together with the responses triggered by that request make up a SIP transaction. All responses to a request contain the same values in the Call-ID, CSeq, To, and From, as shown in the examples below. This allows responses to be matched with requests. The functions served by these parameters are commonly known in the art.

A successful SIP invitation consists of two requests, INVITE followed by an ACK request. The ACK request following an INVITE is not part of the transaction since it may traverse a different set of hosts. The INVITE request asks the called party to join a particular conference or establish a two-party conversation. After the called party has agreed to participate in the call by responding with, for instance, a 200 OK message, the caller confirms that it has received that response by sending an ACK request. If the caller no longer wants to participate in the call, it sends a BYE request instead of an ACK. The INVITE request typically contains a session description that provides the called party with enough information to join the session. The session description enumerates the media types and formats that the caller is willing to use and where it wishes the media data to be sent. If the called party wishes to accept the call, it responds to the invitation by returning a similar description listing the media it wishes to use.

The SIP INVITE request of the current invention includes an additional header added by the NS 23. The added header will use the SIP Require header protocol extension mechanism. The Require header is used to tell the IMS 25 about the options that must be supported. The proposed format for this header includes a suitable tag, such as:

Required: org.ietf.messaging and the following parameters:

messaging-param="action="("deposit"|"retrieval")

deposit-type="dtype="("cfu"|"cfb"|"cfna")

where the action parameter identifies whether a deposit or retrieval operation is being performed and the dtype parameter determines the call forwarding condition. The dtype parameter, which is required only for deposit actions, includes values: cfu, for call forwarding unconditional; cfb, for call forwarding busy; and cfna, for call forwarding no answer.

The NS 23 adds the Require header and associated parameters to the SIP INVITE request forwarded to the IMS 25 by the NS 23. The NS 23 must first establish whether a called party, being an IMS account user, has selected to have all calls unconditionally forwarded to his message mailbox in the IMS 25. This information is acquired from the called party by the NS 23 via a call made by the called party to the NS 23 when the called party activates the unconditional call forwarding feature on the called party's telephone, or other communicating device. The NS 23 determines whether a called party is busy as a result of receiving a busy response, such as "486 Busy Here", in response to the INVITE request from the NS 23 to the called party during initial call setup. The NS 23 determines whether a called party is not answering as a result of receiving a request time-out in response to the INVITE request from the NS 23 to the called party during initial call setup.

The call flow for general IP call setup between a calling party and a called party using the SIP protocol is well known in the art and not detailed herein to avoid unnecessarily obscuring the invention. The present invention therefore focuses on the method of communications required between the NS 23 and IMS 25, and more particularly the addition of the Require header and its associated parameters.

Figure 2:
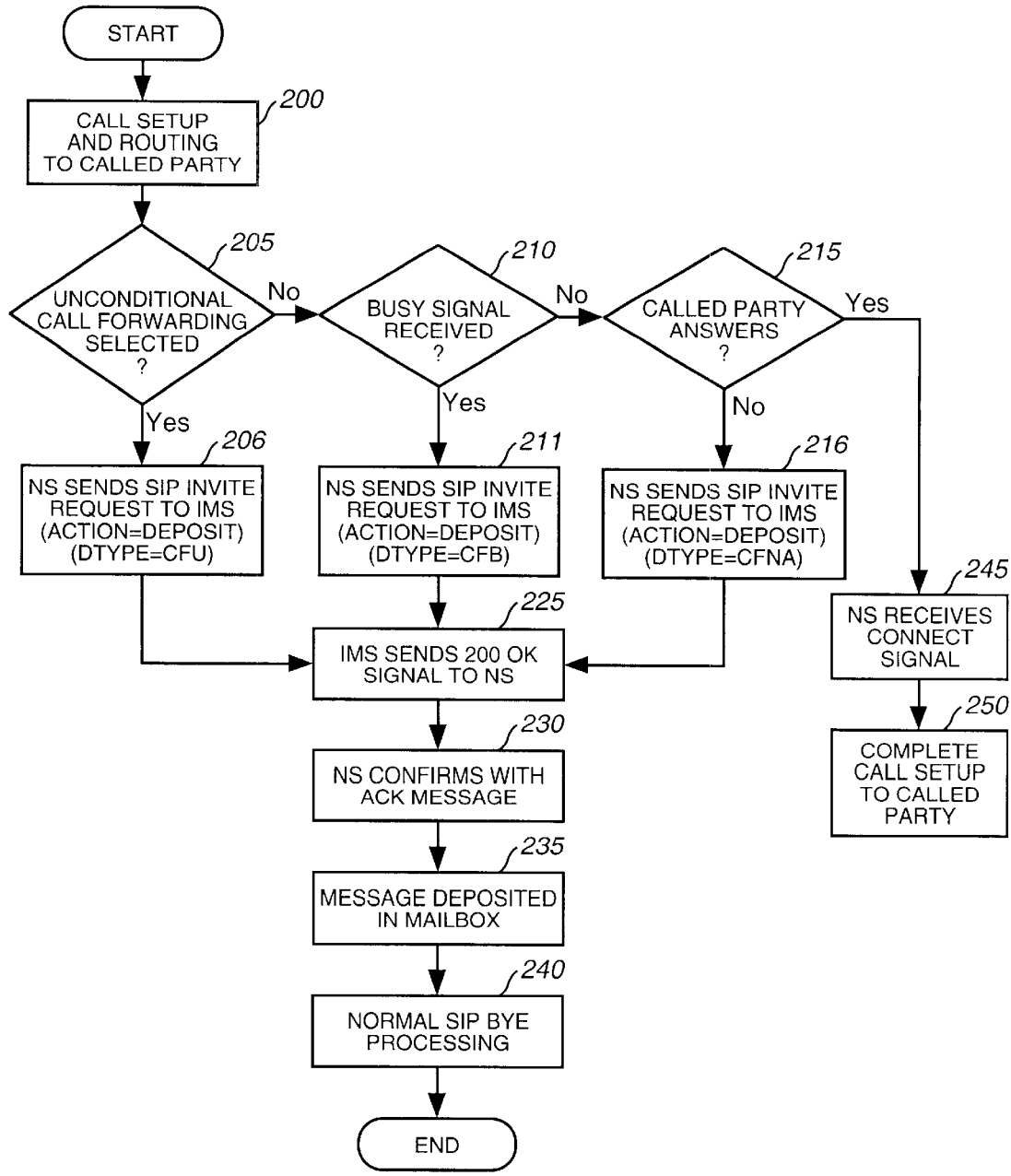
FIG. 2 is a flow chart illustrating a method of depositing a message in accordance with an embodiment of the present invention

Referring to FIG. 2, a method of depositing a message into the IMS 25 begins with a call setup and routing to the called party as described above and as represented in step 200. In step 205 the NS 23 determines if the called party has previously activated the unconditional call forwarding feature. If the unconditional call forwarding feature has been activated by the called party, the NS 23 sends an SIP INVITE request to the IMS 25 which includes the additional Require header with the parameters action=deposit and dtype=cfu in step 206 to indicate an unconditional call forwarding message deposit. However, if the unconditional call forwarding feature has not been activated by the called party, the NS 23 determines if a busy response, such as 486 Busy Here, is received in response to the INVITE request from the NS 23 to the called party during initial call setup in step 210. If a busy response is received, the NS 23 sends an SIP INVITE request to the IMS 25 which includes the additional Require header with the parameters action=deposit and dtype=cfb in step 211 to indicate a conditional busy call forwarding message deposit. However, if the busy response is not received by the NS 23, the NS 23 determines if the called party is not answering in step 215, or more particularly, whether a request time-out has been received by the NS 23 in response to the INVITE request from the NS 23 to the called party during initial call setup. If a request time-out is received, the NS 23 sends an SIP INVITE request to the IMS 25 which includes the additional Require header with the parameters action=deposit and dtype=cfna in step 216 to indicate a conditional no answer call forwarding message deposit. However, if the request time-out is not received by the NS 23, the NS 23 determines if the NS 23 receives a connect signal in step 245 and completes the call setup to the called party in step 250.

In steps 206, 211, or 216, a typical SIP INVITE request call flow sent from the NS 23 to the IMS 25 including the additional SIP Require header is shown below:

```
INVITE sip:IMS-mailbox-id@ims.wcom.com SIP/2.0
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: Called User <sip:called-user@sip.wcom.com>
Callid: 123456@calling-host.com
CSeq: 1 INVITE
Contact: <sip:calling-user@calling-host.com>
Required: org.ietf.messaging
action=deposit
dtype=cfb
Content-Type: application/sdp
Content-Length:...
v=0
o=UserA 2890844526 2890844526 IN IP4 client.here.com
t=0 0
t=0 0
c=IN IP4 100.101.102.103
m=audio 49170 RTP/AVP 0
a=rtpmap:0 PCMU/8000
```

In the above example the dtype parameter selected contains the value cfb, indicating a conditional busy call forwarding deposit operation, as in step 210. This parameter would differ for the SIP INVITE request of steps 205 and 245 and would instead be cfu and cfna, respectively.

In any case, the IMS 25 responds to the SIP INVITE request by sending a 200 OK message to the NS 23 in step 225, indicating that the request was successful and the IMS 25 has agreed to participate in the call with the NS 23. A typical response is shown below:

```
SIP/2.0 200 OK
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: Called User <sip:called-user@sip.wcom.com>
Callid: 123456@calling-host.com
CSeq: 1 INVITE
Contact: <sip:IMS-mailbox-id @ims.wcom.host.com>
Content-Type: application/sdp
Content-Length:...
v=0
o=UserB 2890844527 2890844527 IN IP4 client.there.com
t=0 0
t=0 0
c=IN IP4 110.111.112.113
m=audio 3456 RTP/AVP 0
a=rtpmap:0 PCMU/8000
```

The NS 23 then confirms that it has received a final response to the SIP INVITE request in step 230 by sending an ACK message to the IMS 25, typically as shown below:

```
ACK sip:IMS-mailbox-id@ims.wcom.com SIP/2.0
VIA: SIP/2.0/UDP calling-host.com
VIA: SIP/2.0/UDP ns.wcom.com
Route: <sip:calling-user@calling-host.com>
From: Calling User <sip:calling-user@calling-host.com>
To: Called User <sip:called-user@sip.wcom.com>
Callid: 123456@calling-host.com
CSeq: 1 ACK
Content-Length: 0
```

The message, being of video or voice content, is then deposited into the called party's mailbox address, the called party being an IMS account user, by the IMS 25 in step 235. Communication is then terminated via normal SIP BYE processing in step 240.

Figure 3:
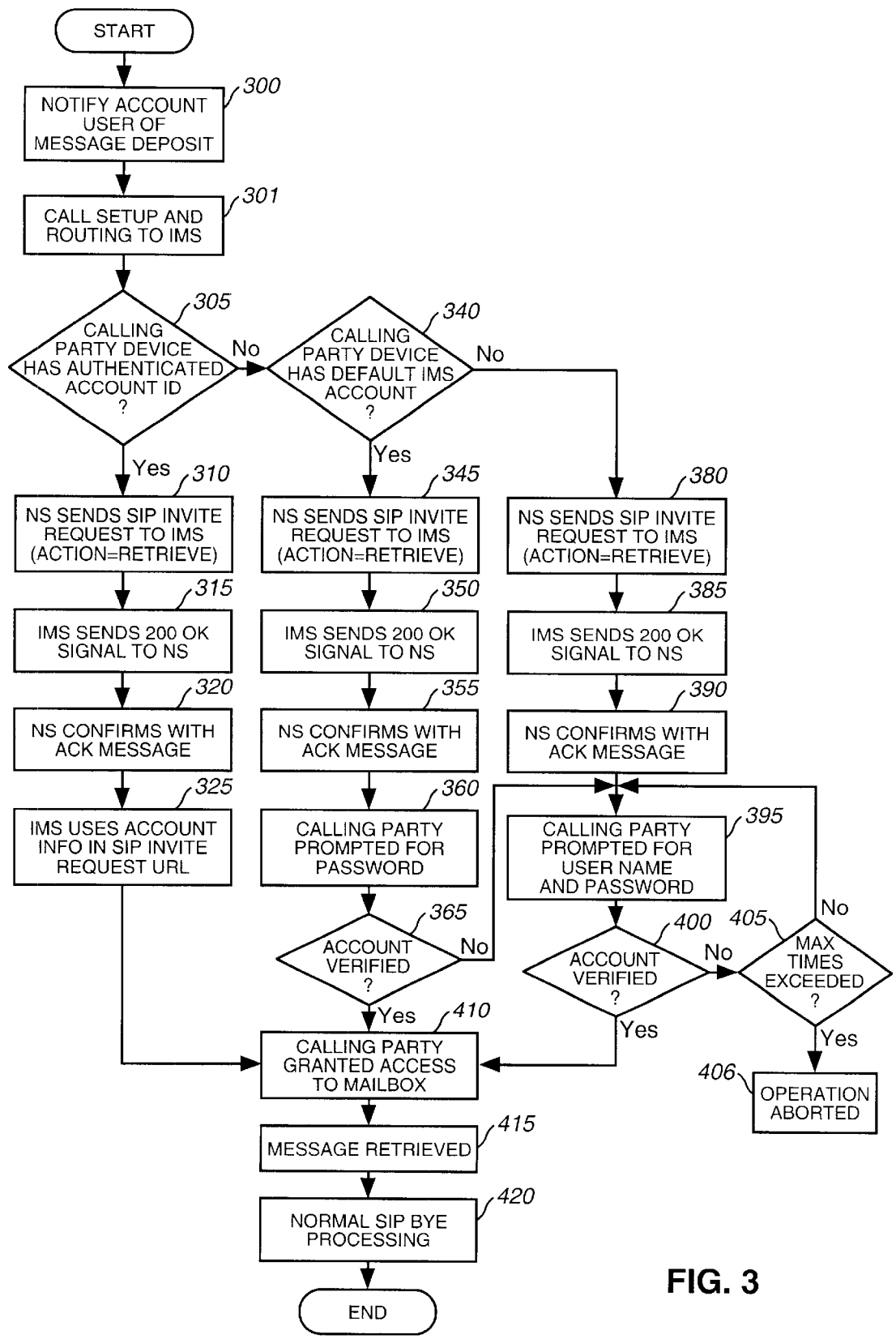
FIG. 3 is a flow chart illustrating a method of retrieving a message in accordance with an embodiment of the present invention.

A method of retrieving a deposited message in accordance with the present invention is illustrated in FIG. 3. Referring to FIG. 3, an IMS account user is notified of a message having been deposited into the user's mailbox via a call placed by the IMS 25 activating a message alert feature on the user's phone, or other communicating device, in step 300. The user's subsequent call to retrieve the deposited message is setup and routed to the IMS 25 by the NS 23 in step 300. The content of SIP INVITE request will vary according to three possible scenarios, as determined in steps 305 and 340. However, in any case the SIP INVITE request will include the additional Require header with only the action=retrieval parameter.

In step 305, if the IMS account user's account information has been authenticated by the NS 23, the call flow between the NS 23 and IMS 25 will, for example, be as follows, beginning with step 310 in which the NS 23 sends the SIP INVITE request.

```
INVITE sip:IMS-account-id@ims.wcom.com SIP/2.0
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:calling-user@calling-host.com>
Required: org.ietf.messaging
action=retrieval
Content-Type: application/sdp
Content-Length:...
v=0
o=UserA 2890844526 2890844526 IN IP4 client.here.com
t=0 0
t=0 0
c=IN IP4 100.101.102.103
```

```
m=audio 49170 RTP/AVP 0
a=rtpmap:0 PCMU/8000
```

The IMS 25 responds to the SIP INVITE request by sending a 200 OK message to the NS 23 in step 315, indicating that the request was successful and the IMS 25 has agreed to participate in the call with the NS 23. A typical response is shown below:

```
SIP/2.0 200 OK
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:IMS-mailbox-id @ims.wcom.host.com>
Content-Type: application/sdp
Content-Length:...
v=0
o=UserB 2890844527 2890844527 IN IP4 client.there.com
t=0 0
t=0 0
c=IN IP4 110.111.112.113
m=audio 3456 RTP/AVP 0
a=rtpmap:0 PCMU/8000
```

The NS 23 then confirms that it has received a final response to the SIP INVITE request in step 320 by sending an ACK message to the IMS 25, typically as shown below:

```
ACK sip:IMS-mailbox-id@ims.wcom.com SIP/2.0
VIA: SIP/2.0/UDP calling-host.com
VIA: SIP/2.0/UDP ns.wcom.com
Route: <sip:calling-user@calling-host.com>
From: Calling User <sip:calling-user@calling-host.com>
To: voicemail <sip:voicemail @sip.wcom.com>
Callid: 123456@calling-host.com
CSeq: 1 ACK
Content-Length: 0
```

In the above scenario, no prompting is required since the IMS account user's information is authenticated and, in step 325, the IMS 25 uses the account information indicated in the INVITE request Uniform Resource Locator (URL). Thereafter, the calling user is granted access to the mailbox in step 410 and the message is retrieved in step 415, which is followed by normal SIP BYE processing at step 420 to end the call.

On the other hand, if the IMS account user cannot be authenticated in step 305, and the user is accessing the IMS 25 from a device that has a default IMS account associated with it in step 340, the procedure instead continues to step 345, providing an SIP INVITE request from the NS 23 to the IMS 25 as follows, for example:

```
INVITE sip:IMS-accound-id:????@ims.wcom.com SIP/2.0
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:calling-user@calling-host.com>
Required: org.ietf.messaging
action=retrieval
Content-Type: application/sdp
Content-Length:...
v=0
o=UserA 2890844526 2890844526 IN IP4 client.here.com
t=0 0
t=0 0
c=IN IP4 100.101.102.103
m=audio 49170 RTP/AVP 0
a=rtpmap:0 PCMU/8000
```

The IMS 25 responds to the SIP INVITE request by sending a 200 OK message to the NS 23 in step 350, indicating that the request was successful and the IMS 25 has agreed to participate in the call with the NS 23. A typical response is shown below:

```
SIP/2.0 200 OK
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:IMS-mailbox-id @ims.wcom host.com>
Content-Type application/sdp
Content-Length:...
v=0
o=UserB 2890844527 2890844527 IN IP4 client.there.com
t=0 0
t=0 0
c=IN IP4 110.111.112.113
m=audio 3456 RTP/AVP 0
a=rtpmap:0 PCMU/8000
```

The NS 23 then confirms that it has received a final response to the SIP INVITE request in step 355 by sending an ACK message to the IMS 25, typically as shown below:

```
ACK sip:IMS-mailbox-id@ims.wcom.com SIP/2.0
VIA: SIP/2.0/UDP calling-host.com
VIA: SIP/2.0/UDP ns.wcom.com
Route: <sip:calling-user@calling-host.com>
From: Calling User <sip:calling-user@calling-host.com>
To: voicemail <sip:voicemail @sip.wcom.com>
Callid: 123456@calling-host.com
CSeq: 1 ACK
Content-Length: 0
```

The SIP INVITE request above contains the account information, with no password authentication. At this point, the IMS 25 prompts the calling IMS account user for a password to verify the account contained in the INVITE request URL in step 360. If the account is verified, the procedure continues to steps 410–420 as described above. If, however, the password entered is incorrect, or the user indicates he or she is calling from a device with a default account assigned to it corresponding to another user's account, then the IMS 25 prompts the user for a user name and password in step 395 and continues to step 400 as described below.

However, if in step 340, the IMS account user is accessing the IMS 25 from a gateway or other device that does not have a default IMS account assigned to it, the NS 23 sends an account unknown SIP INVITE request to the IMS 25 in step 380 as shown below:

```
INVITE sip:UNKNOWN@ims.wcom.com SIP/2.0
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:calling-user@calling-host.com>
Required: org.ietf.messaging
action=retrieval
Content-Type: application/sdp
Content-Length:...
v=0
o=UserA 2890844526 2890844526 IN IP4 client.here.com
t=0 0
t=0 0
c=IN IP4 100.101.102.103
m=audio 49170 RTP/AVP 0
a=rtpmap:0 PCMU/8000
```

The IMS 25 responds to the SIP INVITE request by sending a 200 OK message to the NS 23 in step 385, indicating that the request was successful and the IMS 25 has agreed to participate in the call with the NS 23. A typical response is shown below:

```
SIP/2.0 200 OK
VIA: SIP/2.0/UDP calling-host.com
VIA: SIP/2.0/UDP ns.wcom.com
Record-Route: <sip:ns.wcom.com>
From: Calling User <sip:calling-user@calling-host.com>
To: voicemail <sip:voicemail@sip.wcom.com>
Callid: 123456@calling-host.com
CSeq: 1 INVITE
Contact: <sip:IMS-mailbox-id @ims.wcom.host.com>
Content-Type: application/sdp
Content-Length:...
v=0
o=UserB 2890844527 2890844527 IN IP4 client.there.com
t=0 0
t=0 0
c=IN IP4 110.111.112.113
m=audio 3456 RTP/AVP 0
a=rtpmap:0 PCMU/8000
```

The NS 23 then confirms that it has received a final response to the SIP INVITE request in step 390 by sending an ACK message to the IMS 25, typically as shown below:

```
ACK sip:IMS-mailbox-id@ims.wcom.com SIP/2.0
VIA: SIP/2.0/UDP calling-host.com
VIA: SIP/2.0/UDP ns.wcom.com
Route: <sip.calling-user@calling-host.com>
From: Calling User <sip:calling-user@calling-host.com>
To: voicemail <sip:voicemail @sip.wcom.com>
Callid: 123456@calling-host.com
CSeq: 1 ACK
Content-Length: 0
```

In this case, the SIP INVITE request contains no account or authentication information, but only the identifier UNKNOWN in the INVITE request URL. Accordingly, in step 395, a calling party is prompted for a user name and password. If the account is verified in step 400, the procedure continues to steps 410–420 as described above.

However, if the user name and password is entered incorrectly, the user is allowed a predetermined number of re-entry attempts in step 405 before the operation is aborted, ending the call in step 406.

While the present invention has been described in detail with reference to the preferred embodiments, they represent mere exemplary applications. Thus, it is to be clearly understood that many variations can be made by anyone of ordinary skill in the art while staying within the scope and spirit of the present invention as defined by the appended claims.

What is claimed is:

1. A method of signaling an Integrated Messaging System (IMS) on an Internet Protocol (IP) based network to deposit a message, comprising the steps of:

sending a Session Initiation Protocol (SIP) INVITE request to the IMS indicating a message deposit action;

receiving a corresponding SIP message from the IMS agreeing to participate in the message deposit action; and sending an SIP acknowledge message to the IMS confirming receipt of the corresponding SIP message.

2. The method recited in claim 1, further comprising the step of depositing the message in a destination mailbox.

3. The method recited in claim 2, wherein the deposited message includes voice data.

4. The method recited in claim 2, wherein the deposited message includes video data.

5. The method recited in claim 1, wherein the SIP INVITE request includes a Require header following the SIP Require header protocol extension mechanism.

6. The method recited in claim 5, wherein the Require header includes at least a first and second parameter, wherein the first parameter indicates the message deposit action to the IMS and the second parameter is a call forwarding parameter.

7. The method recited in claim 6, wherein the call forwarding parameter identifies whether the message was deposited unconditionally or conditionally based on a busy signal condition of a called party or a no answer condition of the called party.

8. A method of signaling an Integrated Messaging System (IMS) on an Internet Protocol (IP) based network to retrieve a deposited message, comprising the steps of:

sending a Session Initiation Protocol (SIP) INVITE request to the IMS indicating a message retrieval action;

receiving a corresponding SIP message from the IMS agreeing to participate in the message retrieval action; and sending an SIP acknowledge message to the IMS confirming receipt of the corresponding SIP message.

9. The method recited in claim 8, wherein the IMS sends and receives messages from a secure Network Server (NS).

10. The method recited in claim 8, further comprising the step of retrieving the deposited message from a mailbox corresponding to known account information.

11. The method recited in claim 10, wherein the known account information includes an account identification which has been authenticated.

12. The method recited in claim 10, wherein the known account information includes an account identification which is not authenticated, and wherein the method includes the further step of prompting a user for a password.

13. The method recited in claim 10, wherein the known account information includes no account identification, and wherein the method includes the further step of prompting a user for a user name and password.

14. The method recited in claim 12, further comprising the step of asking the user for a user name and a new password when an incorrect password is entered for the prompted password.

15. The method recited in claim 10, wherein the retrieved message includes voice data.

16. The method recited in claim 10, wherein the retrieved message includes video.

17. The method recited in claim 8, wherein the SIP INVITE request includes a Require header following the SIP Require header protocol extension mechanism.

18. The method recited in claim 17, wherein the Require header includes at least a first parameter, wherein the first parameter indicates the message retrieval action to the IMS.

19. The method recited in claim 8, wherein an IMS account user is notified when the deposited message is ready for retrieval.

20. A method of signaling an Integrated Messaging System (IMS) on an Internet Protocol (IP) based network to deposit a message and retrieve the deposited message, comprising the steps of:

sending a Session Initiation Protocol (SIP) INVITE request to the IMS indicating a message deposit action;

receiving a corresponding SIP message from the IMS agreeing to participate in the message deposit action;

sending an SIP acknowledge message to the IMS confirming receipt of the corresponding SIP message;

depositing the message in a destination mailbox;

sending a Session Initiation Protocol (SIP) INVITE request to the IMS indicating a message retrieval action;

receiving a corresponding SIP message from the IMS agreeing to participate in the message retrieval action;

sending an SIP acknowledge message to the IMS confirming receipt of the corresponding SIP message; and retrieving the deposited message from the destination mailbox, wherein the destination mailbox corresponds to known account information.

* * * * *